(12) United States Patent
Tanaka et al.

(10) Patent No.: US 9,890,267 B2
(45) Date of Patent: Feb. 13, 2018

(54) RUBBER COMPOSITION FOR TIRES AND PNEUMATIC TIRE

(71) Applicants: Ken Tanaka, Tokyo (JP); Takahiro Saito, Tokyo (JP)

(72) Inventors: Ken Tanaka, Tokyo (JP); Takahiro Saito, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 239 days.

(21) Appl. No.: 14/772,640

(22) PCT Filed: Mar. 18, 2014

(86) PCT No.: PCT/JP2014/057218
§ 371 (c)(1),
(2) Date: Sep. 3, 2015

(87) PCT Pub. No.: WO2014/148453
PCT Pub. Date: Sep. 25, 2014

(65) Prior Publication Data
US 2016/0017124 A1    Jan. 21, 2016

(30) Foreign Application Priority Data

Mar. 22, 2013   (JP) ................................ 2013-060064

(51) Int. Cl.
| | |
|---|---|
| C08K 5/378 | (2006.01) |
| C08K 5/40 | (2006.01) |
| C08K 5/25 | (2006.01) |
| C08K 5/3432 | (2006.01) |
| C08K 5/3447 | (2006.01) |
| C08K 5/37 | (2006.01) |
| C08K 5/29 | (2006.01) |
| C08K 5/39 | (2006.01) |
| C08K 3/04 | (2006.01) |
| C08K 5/3415 | (2006.01) |
| B60C 15/06 | (2006.01) |
| B60C 1/00 | (2006.01) |
| C08L 7/00 | (2006.01) |
| C08L 9/00 | (2006.01) |
| C08L 21/00 | (2006.01) |
| C08K 5/372 | (2006.01) |

(52) U.S. Cl.
CPC .................. *C08K 5/40* (2013.01); *B60C 1/00* (2013.01); *B60C 15/06* (2013.01); *C08K 3/04* (2013.01); *C08K 5/25* (2013.01); *C08K 5/29* (2013.01); *C08K 5/3415* (2013.01); *C08K 5/3432* (2013.01); *C08K 5/3447* (2013.01); *C08K 5/378* (2013.01); *C08K 5/3725* (2013.01); *C08K 5/39* (2013.01); *C08L 7/00* (2013.01); *C08L 9/00* (2013.01); *C08L 21/00* (2013.01); *B60C 2001/005* (2013.01); *B60C 2015/0621* (2013.01); *C08K 3/045* (2017.05)

(58) Field of Classification Search
CPC . C08K 5/378; C08K 5/40; C08K 5/25; C08K 5/3432; C08K 5/3447; C08K 5/3725; C08K 5/29; C08K 5/39; C08K 3/04; C08K 5/3415; C08K 2003/045; B60C 15/06; B60C 1/00; B60C 2015/0621; B60C 2001/005; C08L 7/00; C08L 9/00; C08L 21/00
USPC ......................................................... 152/543
See application file for complete search history.

(56) References Cited

U.S. PATENT DOCUMENTS

| | | | |
|---|---|---|---|
| 5,294,253 | A | 3/1994 | Carlson et al. |
| 5,430,087 | A | 7/1995 | Carlson et al. |
| 5,430,088 | A | 7/1995 | Ohashi et al. |
| 6,211,281 | B1 | 4/2001 | Kusano |
| 2011/0236816 | A1 | 9/2011 | Stanyschofsky et al. |

FOREIGN PATENT DOCUMENTS

| | | |
|---|---|---|
| EP | 0 609 499 A1 | 8/1994 |
| EP | 1 083 199 A1 | 3/2001 |
| JP | 61-143203 A | 6/1986 |
| JP | 06212024 A | 8/1994 |
| JP | 06-279624 A | 10/1994 |
| JP | 741602 A | 2/1995 |
| JP | 11-001576 A | 1/1999 |
| JP | 11-209515 A | 8/1999 |
| JP | 2003128845 A | 5/2003 |
| JP | 3778662 B2 | 5/2006 |
| JP | 2007-131730 A | 5/2007 |
| JP | 2010-013262 A | 1/2010 |
| JP | 2011-132400 A | 7/2011 |
| JP | 2012-505939 A | 3/2012 |

OTHER PUBLICATIONS

International Preliminary Report on Patentability dated Sep. 22, 2015 from the International Bureau in counterpart International application No. PCT/JP2014/057218.
Communication dated Dec. 22, 2015, issued by the European Patent Office in corresponding European Application No. 14768117.5.
International Search Report of PCT/JP2014/057218 dated May 27, 2014.

*Primary Examiner* — Angela C Scott
(74) *Attorney, Agent, or Firm* — Sughrue Mion, PLLC (57) ABSTRACT

Provided is a rubber composition for a tire soft stiffener improved in a crack resistance and a low heat generation, wherein carbon black (A) contained in the rubber shows specific particle size distribution behavior in an aggregate mass distribution curve, and the composition contains at least one compound selected from carbon black coupling agents consisting of bismaleimide (B), alkylidene hydrazide (C), disulfane (D) and carboxylic hydrazide (E), and a heavy-duty tire produced by using the above rubber composition is further provide.

12 Claims, 2 Drawing Sheets

RUBBER COMPOSITION FOR TIRES AND PNEUMATIC TIRE

CROSS REFERENCE TO RELATED APPLICATIONS

This is a National Stage of International Application No. PCT/JP2014/057218 filed Mar. 18, 2014, claiming priority based on Japanese Patent Application No. 2013-060064 filed Mar. 22, 2013, the contents of all of which are incorporated herein by reference in their entirety.

TECHNICAL FIELD

The present invention relates to a rubber composition for tires blended with carbon black having a specific particle size distribution and a chemical for preventing aggregation of carbon black, and a tire produced by using the same.

BACKGROUND ART

In order to improve a bead part of a tire for heavy-duty vehicles to reduce a heat generation thereof, various approaches such as changing a blend amount of carbon black and carbon black species, and/or applying a dispersion improving agent have so far been tried. The heat generation can be improved by the above conventional methods, but the durability and the crack resistance were found to be lowered, and tires produced by the conventional methods were unsatisfactory for applications in heavy-duty vehicles used under severe conditions.

In particular, when the carbon black species is intended to be changed, various carbon blacks including commercially available products produced by modification of furnaces are available. However, the properties of carbon blacks cannot necessarily be selected as desired, and it is not easy to select the carbon black species which meet the purposes by trial and error.

In the above situations, if carbon blacks having properties which originate in two or more carbon black species can be used, expected are the advantages that the choice of carbon blacks is broadened and that the intended performances are readily estimated by modifying a blend ratio thereof.

It is disclosed in patent document 1 that a product referred to as hard carbon black having a nitrogen adsorption specific surface area of 60 m$^2$/g or more and a product referred to as soft carbon black having a nitrogen adsorption specific surface area of 50 m$^2$/g or less are used in a mixture. Selection from two divisions in the nitrogen adsorption specific surface area is shown therein, however, relationship between the respective divisions is not shown.

It is disclosed in patent document 2 that two kinds of carbon black of a large particle diameter having an iodine adsorbing No. of less than 115 and carbon black of a small particle diameter having an iodine adsorbing No. of exceeding 115 are used in a mixture, but selection from two divisions in which 115 is set to a boundary in the iodine adsorbing No. as a standard of a particle diameter is shown in the above document, however, relationship between the respective divisions is not shown. Similarly, divisions prescribed by DBP No. and iodine adsorbing No. are disclosed as well therein, however, selection from two divisions in which 110 is set to a boundary in the DBP No. is shown also in the above case, and relationship between the respective divisions is not shown therein.

It is disclosed in patent document 3 that two kinds of carbon blacks which are prescribed by a nitrogen adsorption specific surface area and dibutyl phthalate absorption are used in a mixture, however, it is not shown therein what relationship has to be present between physical property values relevant to the particle sizes of the above carbon blacks. Two kinds of the specific carbon blacks are merely used, and the respective carbon blacks are selected based on a division of whether the above physical property values are larger or smaller than a certain threshold value. Also, an effect caused by the other specific components is more predominant than an effect caused by mixing the carbon blacks, and an effect caused by a difference between the blend ratios of the two kinds of the carbon blacks is not clear.

It is disclosed in patent document 4 that two kinds of carbon blacks in which a relationship between a cetyltrimethylammonium bromide adsorption specific surface area and a dibutyl phthalate absorption is prescribed are used in a mixture, however, a relationship between the physical property values of the two kinds of the carbon blacks is not clarified.

Also, a method for mixing carbon blacks based on more basic physical property values such as a particle diameter or a particle size of carbon blacks is not disclosed in any of the patent documents 1 to 4.

CONVENTIONAL ART DOCUMENTS

Patent Documents

Patent document 1: Japanese Patent Application Laid-Open No. JP-A 2003-128845
Patent document 2: Japanese Patent Application Laid-Open No. JP-A H07-041602
Patent document 3: Japanese Patent No. 3778662
Patent document 4: Japanese Patent Application Laid-Open No. JP-A H06-212024

DISCLOSURE OF THE INVENTION

Provided is a rubber composition which is improved, though hard to be improved by a single kind of carbon black, so as to allow a low heat generation and a crack resistance to be consistent and which is endurable to use in heavy-duty tires.

Problems to be Solved by the Invention

The present inventors have found that carbon blacks showing specific particle size distribution behaviors are dispersed well in rubber and that the carbon blacks used in combination with a dispersion improving agent provide a rubber composition suited to a soft stiffener part of heavy-duty tires having an ultralow heat generation while maintaining a balance thereof with a crack resistance which has not so far been possible, and thus, the present inventors have come to complete the present invention.

That is, the present invention resides in the following items (1) to (12).

(1) A rubber composition containing a natural rubber and/or a synthetic rubber, wherein carbon black (A) contained in the rubber has $\Delta D_{80}$ and $\Delta D_{10}$ satisfying 0.01 µm≤particle size distribution $\Delta D_{80}$≤0.06 µm and 0.2 µm≤ particle size distribution $\Delta D_{10}$≤0.6 µm, and the composition contains at least one compound selected from carbon black coupling agents consisting of bismaleimide (B), alkylidene hydrazide (C), disulfane (D) and carboxylic hydrazide (E);

(wherein $\Delta D_{80}$ and $\Delta D_{10}$ each represent widths of distribution at 80% and 10% of a maximum point in terms of a height of a frequency in an aggregate mass distribution curve obtained by measuring a disc centrifugal settling particle size distribution according to JIS K6217-6).

(2) The rubber composition as described in the above item (1), wherein a $\Delta D_{10}$ central value of the carbon black (A) contained in the rubber is 0.1 μm or more and 0.2 μm or less;
(wherein the $\Delta D_{10}$ central value is a central value of distribution at 10% of a maximum point in terms of a height of a frequency in an aggregate mass distribution curve obtained by measuring a disc centrifugal settling particle size distribution according to JIS K6217-6).

(3) The rubber composition as described in the above item (1) or (2), wherein a $\Delta D_{80}$ central value of the carbon black (A) contained in the rubber is 0.03 μm or more and 0.15 μm or less;
(wherein the $\Delta D_{80}$ central value is a central value of distribution at 80% of a maximum point in terms of a height of a frequency in an aggregate mass distribution curve obtained by measuring a disc centrifugal settling particle size distribution according to JIS K6217-6).

(4) The rubber composition as described in any one of the above items (1) to (3), wherein the carbon black (A) is obtained at a single step by burning in a production furnace, or obtained by mixing two or more components of carbon blacks or removing partially carbon blacks having some particle size region from carbon blacks having a broad particle size distribution.

(5) The rubber composition as described in any one of the above items (1) to (4), wherein the carbon black (A) is obtained by mixing two or more components of carbon blacks.

(6) The rubber composition as described in any one of the above items (1) to (5), wherein the carbon black (A) satisfies 0.25 μm ≤ particle size distribution $\Delta D_{10}$ ≤ 0.45 μm and 0.03 μm ≤ particle size distribution $\Delta D_{80}$ ≤ 0.05 μm.

(7) The rubber composition as described in any one of the above items (1) to (6), wherein the bismaleimide (B) contains at least one selected from the group consisting of compounds represented by the following Formula (I):

(wherein R represents a divalent aromatic hydrocarbon group having 6 to 30 carbon atoms, or a divalent alkyl aromatic hydrocarbon group having 7 to 24 carbon atoms, and x and y each represent independently an integer of 0 to 3).

(8) The rubber composition as described in any one of the above items (1) to (7), wherein the alkylidene hydrazide (C) contains at least one selected from the group consisting of compounds represented by the following Formula (II) or (III):

(wherein $R_A$ represents one selected from a divalent aromatic hydrocarbon group having 6 to 30 carbon atoms, a divalent hydrocarbon group obtained by removing two hydrogen atoms in any positions from a saturated or unsaturated aliphatic hydrocarbon having 0 to 18 carbon atoms, and a carbonyl group; $R_B$ represents a divalent aromatic group having 6 to 30 carbon atoms; a substituent X of $R_B$ is at least one selected from a hydroxyl group and an amino group, or $R_B$ is a pyridinediyl group, and X is a hydrogen atom to cause $R_B$-X to form a pyridyl group; $R_1$ to $R_4$ represent hydrogen and a linear, branched or cyclic alkyl group having 1 to 18 carbon atoms, or an aromatic group, and they may be the same as or different from each other).

(9) The rubber composition as described in any one of the above items (1) to (8), wherein the disulfane (D) contains at least one selected from the group consisting of compounds represented by the following Formula (IV):

$$R_D-S-R_D \quad (IV)$$

(wherein $R_D$ represents a thiocarbamoyl group, or any of an alkyl group, an acyl group, an alkylamino group and an alkylamide group each having a linear or branched alkyl chain having 2 to 8 carbon atoms which is connected to a benzimidazole group or a guanidine group; the thiocarbamoyl group has any of a linear, branched or alicyclic alkyl group having 6 to 10 carbon atoms, and an arylalkyl group substituted with an aromatic group; hydrogens on a carbon atom and a nitrogen atom of the benzimidazole skeleton may be substituted with any of a linear or branched alkyl group having 1 to 4 carbon atoms, a halogen atom, an amino group, a hydroxyl group and a mercapto group; and the guanidine group may be substituted with any of a linear, branched or alicyclic alkyl group having 1 to 8 carbon atoms, and an aryl group).

(10) The rubber composition as described in any one of the above items (1) to (9), wherein the carboxylic hydrazide (E) contains at least one selected from the group consisting of compounds represented by the following Formula (V):

(wherein $R_E$ represents any of an alkyl group, an acyl group, an alkylamino group and an alkylamide group each having a linear or branched alkyl chain having 2 to 8 carbon atoms which is connected to a benzimidazole group or a guanidine group; hydrogens on a carbon atom and a nitrogen atom of the benzimidazole skeleton may be substituted with any of a linear or branched alkyl group having 1 to 4 carbon atoms, a halogen atom, an amino group, a hydroxyl group and a mercapto group; and the guanidine group may be substituted with any of a linear, branched or alicyclic alkyl group having 1 to 8 carbon atoms, and an aryl group).

(11) The rubber composition as described in any one of the above items (1) to (10), wherein a total blend amount of at least one carbon black coupling agent selected from the compounds (B) to (E) is 0.05 to 20 parts by weight based on 100 parts by weight of the rubber component.

(12) A heavy-duty tire in which the rubber composition as described in any one of the above items (1) to (11) is provided in at least a part of an upper (tread side) part than a bead.

According to the above items (1) to (3) of the present invention, the carbon black having the particle size distribution prescribed in the present invention can be dispersed well in the rubber component, and as a result thereof, the rubber composition endowed with a low heat generation and a crack resistance which are well balanced is obtained. According to item (4) or (5), the rubber composition produced by using carbon black prepared to have the aggregate mass distribution shown in items (1) to (3) is obtained. According to item (6), the condition of more preferred particle size distribution is shown, and obtained is the rubber composition for a soft stiffener in which a low heat generation and a crack resistance are consistent and excellent.

According to items (7) to (11), the carbon black can be bound to the polymer by blending any of the carbon black coupling agents represented by Formulas (I) to (V) in the rubber in a suitable blend amount, whereby the carbon black and the polymer can be bound, and the preferred dispersion state can be maintained. Further, the rubber composition in which a low heat generation is consistent with a crack resistance is obtained. In this regard, if the chemical for binding the carbon black to the polymer is not blended, the carbon blacks are aggregated between the carbon blacks having the respective particle diameter, and the good dispersion state cannot be maintained, so that the good results cannot be obtained.

According to item (12), provided is a heavy-duty tire prepared by using for a soft stiffer part, the rubber composition obtained in items (1) to (11) which is excellent in a low heat generation and a crack resistance.

MODE FOR CARRYING OUT THE INVENTION

Figure 1:
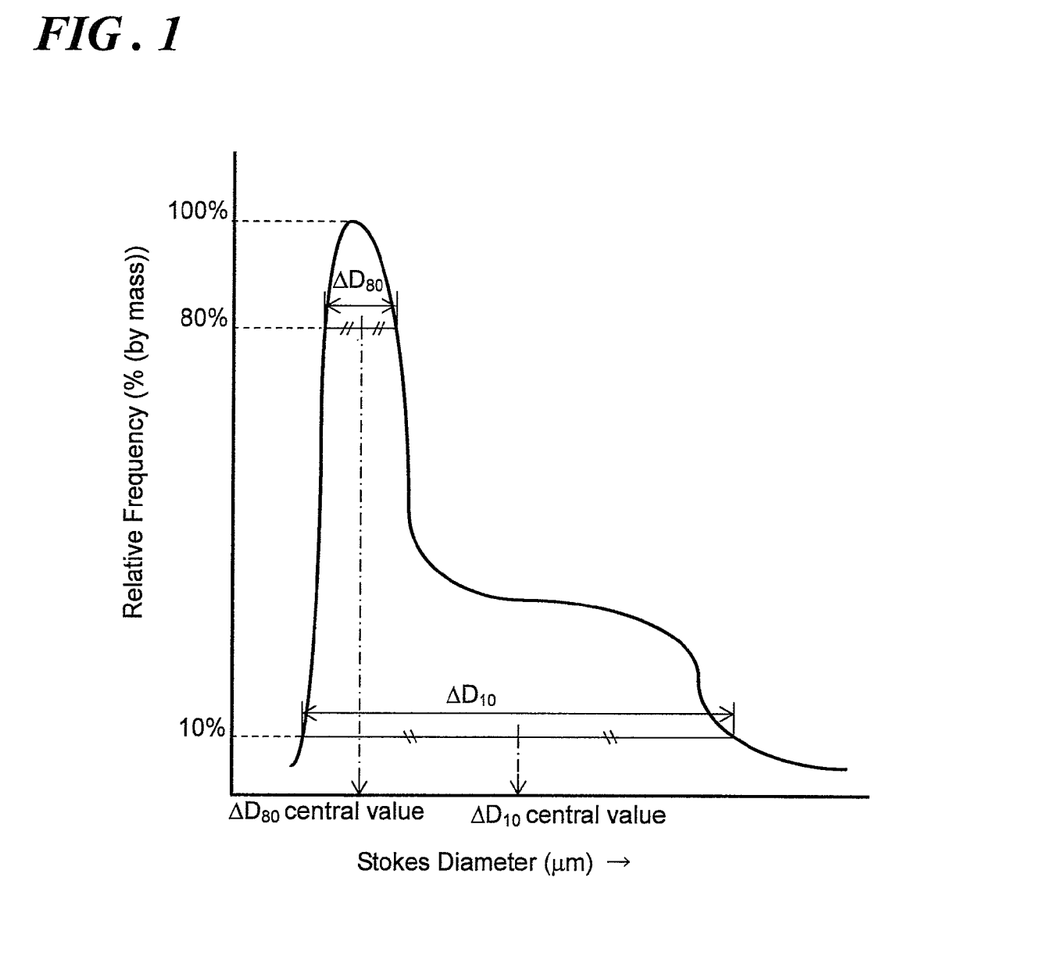
FIG. 1 shows a graph representing schematically an aggregate mass distribution curve and the parameters of the particle sizes of the carbon black.

In the present invention, the carbon black (A) blended in the rubber composition is characterized by having $\Delta D_{80}$ and $\Delta D_{10}$ satisfying 0.01 µm≤particle size distribution $\Delta D_{80}$≤0.06 µm and 0.2 µm≤particle size distribution $\Delta D_{10}$≤0.6 µm, wherein $\Delta D_{80}$ and $\Delta D_{10}$ are widths of particle size distribution shown respectively in an aggregate mass distribution curve shown schematically in FIG. 1 in measuring a disc centrifugal settling particle size distribution.

In order to cause $\Delta D_{80}$ and $\Delta D_{10}$ to satisfy 0.01 µm≤particle size distribution $\Delta D_{10}$≤0.06 µm and 0.2 µm≤particle size distribution $\Delta D_{10}$≤0.6 µm, in a case of blending, the carbon blacks are blended by adding carbon blacks of N600 to N800 at a large particle size side in the code of ASTM and carbon blacks of N300 to N400 at a small particle size side at the same time during kneading, adding a mixture obtained by blending (pre-blending) in advance only carbon blacks during kneading, or kneading a rubber composition containing carbon black of a large particle size and a rubber composition containing carbon black of a small particle size. The distribution satisfying the above conditions can be obtained by blending two kinds of carbon blacks in which distributions of a large particle size and a small particle size are known according a result obtained by simulating a blend ratio of the respective carbon blacks.

When the particle size distribution $\Delta D_{10}$ is 0.2 µm or less, the rubber composition is excellent in a crack resistance but inferior in a heat generation. On the other hand, when $\Delta D_{10}$ is 0.6 µm or more, the rubber composition is excellent in a heat generation but inferior in a crack resistance. Also, when $\Delta D_{80}$ is 0.06 µm or more, the rubber composition is excellent in a heat generation but inferior in a crack resistance. In producing the rubber composition having $\Delta D_{80}$ of 0.01 µm or less, a large demerit is involved therein in terms of the cost, and an effect of reducing the heat generation cannot be expected.

Further, the carbon black satisfies preferably 0.2 µm≤particle size distribution $\Delta D_{10}$≤0.5 µm, particularly preferably 0.25 µm≤particle size distribution $\Delta D_{10}$≤0.45 µm. On the other hand, the carbon black satisfies preferably 0.03 µm≤particle size distribution $\Delta D_{80}$≤0.05 µm. In respect to both $\Delta D_{10}$ and $\Delta D_{80}$, 0.25 µm≤particle size distribution $\Delta D_{10}$≤0.45 µm and 0.03 µm≤particle size distribution $\Delta D_{80}$≤0.05 µm are preferred. In general, when large particle size carbon black is used alone, the rubber composition tends to be improved in a heat generation and reduced in durability, and when small particle size carbon black is used alone, the rubber composition tends to be improved in a heat generation and reduced in durability. However, carbon black which can allow the heat generation and the reinforcing property to be consistent to a high extent is obtained by satisfying the particle size distribution behaviors described above.

The carbon black showing the particle size distribution behaviors described above shows a sharp distribution in a peak of a particle size, as shown in FIG. 1, which provides a mode in the aggregate mass distribution curve, but the curve is broadened in a hem and shows a so-called tailing distribution behavior. Accordingly, the numeral ranges of $\Delta D_{10}$ and $\Delta D_{80}$ are extremely different as described above. At a glance, the curve does not necessarily look showing bimodal or multimodal, and the curve shows distribution behavior clarifying that the curve is not composed of a single component.

A central value of $\Delta D_{10}$ shown in FIG. 1 is preferably 0.1 µm or more and 0.2 µm or less from the viewpoint of a balance between the heat generation performance and the crack resistant performance. In particular, the crack resistance tends to be improved. The condition of obtaining the above central value of $\Delta D_{10}$ can be satisfied by causing the carbon blacks of a large particle size and a small particle size to suitably coexist. Similarly, a case in which a central value of $\Delta D_{80}$ is 0.03 µm or more and 0.15 µm or less is preferred as well from the viewpoint of a balance between the heat generation performance and the crack resistant performance.

The carbon black (A) showing the foregoing particle size distribution behaviors suited to the present invention is considered to be readily obtained by blending, but even carbon black obtained at a single step by modifying a burning condition in a production furnace can be used in a certain case as long as the carbon black satisfies the conditions of the particle size distributions. Also, the carbon black can be obtained as well by removing imperfectly the specific particle size region, and the carbon black can be used in the present invention as long as the carbon black satisfies the conditions of the particle size distributions.

The carbon black used in the present invention which is prepared by mixing or fractionation of carbon blacks so that the conditions described above are satisfied, or produced at a single step is added in an amount of 20 to 110 parts by weight based on 100 parts by weight of the rubber component, whereby the rubber composition used in the present invention can be obtained. In the above case, when the carbon black satisfying the conditions of $\Delta D_{10}$ and $D_{80}$ in particle size distribution is prepared by mixing two kinds of carbon blacks, it is not essential to mix them prior to use, and when a mixing blend ratio thereof satisfying the conditions described above is known in advance, the respective required weight parts of the two kinds of the carbon blacks may added separately to the rubber component at the same time or in time difference so that the carbon blacks reach in total 20 to 110 parts by weight based on 100 parts by weight of the rubber component. Also, the carbon blacks may be added respectively to the rubber components to prepare mixtures, and the mixtures may be put together and kneaded.

Contrary to the above, when a pre-blend prepared by mixing in advance two kinds of the carbon blacks considering dispersibility is used, various methods including a dry method and a wet method can be used in mixing, stirring and the like, and the mixing is preferably carried out to such an extent that particularly the structures of large particle size components are prevented from being broken and causing a particle size change in the above step, or by using a method by which a particle size change is scarcely caused.

In the particle size distributions described above, an addition amount of the carbon black (A) satisfying the conditions of $\Delta D_{10}$ and $\Delta D_{80}$ is preferably 20 to 110 parts by weight, more preferably 30 to 60 parts by weight based on 100 parts by weight of the rubber component.

Next, the rubber composition in the present invention is characterized by containing at least one selected from the group consisting of the bismaleimide compound (B), the alkylidene hydrazide compound (C), the disulfane compound (D) and the carboxylic hydrazide (E).

The bismaleimide compound (B) which can be blended with the rubber composition in the present invention is a compound represented by the following Formula (I):

(wherein R represents a divalent aromatic hydrocarbon group having 6 to 30 carbon atoms, or a divalent alkyl aromatic hydrocarbon group having 7 to 24 carbon atoms, and x and y each represent independently an integer of 0 to 3).

Capable of being shown as the examples of the bismaleimide (B) which can be used in the present invention are N,N'-1,2-phenylenedimaleimide, N,N'-1,3-phenylenedimaleimide, N,N'-1,4-phenylenedimaleimide, N,N'-(4,4'-diphenylmethane)bismaleimide, bis(3-ethyl-5-methyl-4-maleimidephenyl)methane and the like, and at least one of them can be contained in the rubber composition. In particular, N,N'-(4,4'-diphenylmethane)bismaleimide can suitably be used.

The alkylidene hydrazide (compound C) which can be used in the present invention is a compound represented by the following Formula (II) or (III):

(wherein $R_A$ represents one selected from a divalent aromatic hydrocarbon group having 6 to 30 carbon atoms, a divalent hydrocarbon group obtained by removing two hydrogen atoms in any positions from a saturated or unsaturated aliphatic hydrocarbon having 0 to 18 carbon atoms, and a carbonyl group; $R_B$ represents a divalent aromatic group having 6 to 30 carbon atoms; a substituent X of $R_B$ is at least one selected from a hydroxyl group and an amino group, or $R_B$ is a pyridinediyl group, and X is a hydrogen atom to cause $R_B$-X to form a pyridyl group; $R_1$ to $R_4$ represent hydrogen and a linear, branched or cyclic alkyl group having 1 to 18 carbon atoms, or an aromatic group, and they may be the same as or different from each other).

The alkylidene hydrazide compound (C) which can be used in the present invention includes the compounds represented by Formula (II), alkylidene derivatives of such as N,N'-di(1-methylethylidene)-isophthalic dihydrazide, N,N'-di(1-methylethylidene)-adipic dihydrazide, N,N'-di(1-methylpropylidene)-isophthalic dihydrazide, N,N'-di(1-methylpropylidene)-adipic dihydrazide, N,N'-di(1,3-dimethylpropylidene)-isophthalic dihydrazide, N,N'-di(1,3-dimethylpropylidene)-adipic dihydrazide, N,N'-di(1-phenylethylidene)-isophthalic dihydrazide, N,N'-di(1-phenylethylidene)-adipic dihydrazide, terephthalic dihydrazide, azelaic dihydrazide, succinic dihydrazide, icosanoicdicarboxylic dihydrazide, and carbonic dihydrazide. Also, the compound represented by Formula (III) includes alkylidene derivatives of 3-hydroxy-2-naphthoic hydrazide, such as 3-hydroxy-N-(1-methylethylidene)-2-naphthoic hydrazide, 3-hydroxy-N-(1-methylpropylidene)-2-naphthoic hydrazide, 3-hydroxy-N-(1,3-dimethylpropylidene)-2-naphthoic hydrazide, 3-hydroxy-N-(1-phenylethylidene)-2-naphthoic hydrazide, and the like, and in addition thereto, the compound represented by Formula (III) includes alkylidene derivatives of salicylic hydrazide, 4-hydroxybenzoic hydrazide, anthranilic hydrazide, and 1-hydroxy-2-naphthoic hydrazide. Also, the compound represented by Formula (III) in which $R_B$—X is a pyridyl group includes alkylidene derivatives of isonicotinic hydrazide, such as N-(1-methylethylidene)-isonicotinic hydrazide, N-(1-methylpropylidene)-isonicotinic hydrazide, N-(1,3-dimethylpropylidene)-isonicotinic hydrazide, and N-(1-phenylethylidene)-isonicotinic hydrazide.

The disulfane compound (D) which can be used in the present invention contains two linked sulfur atoms in a structure, and the compound may be named as disulfide depending on a nomenclature. The compound is represented by the following Formula (IV):

$$R_D\text{—S—S—}R_D \qquad (IV)$$

(wherein $R_D$ represents a thiocarbamoyl group, or any of an alkyl group, an acyl group, an alkylamino group and an alkylamide group each having a linear or branched alkyl chain having 2 to 8 carbon atoms which is connected to a benzimidazole group or a guanidine group; the thiocarbamoyl group has any of a linear, branched or alicyclic alkyl group having 6 to 10 carbon atoms, and an arylalkyl group substituted with an aromatic group; hydrogens on a carbon atom and a nitrogen atom of the benzimidazole skeleton may be substituted with any of a linear or branched alkyl group having 1 to 4 carbon atoms, a halogen atom, an amino group, a hydroxyl group and a mercapto group; and the guanidine group may be substituted with any of a linear, branched or alicyclic alkyl group having 1 to 8 carbon atoms, and an aryl group).

The compound represented by Formula (IV) includes such as tetraalkylthiuram disulfide, and tetra(arylalkyl)thiuram disulfide in which $R_D$ is a substituted thiocarbamoyl group. Also, the compound includes N,N'-di-(1H-benzimidzole-2-yl)-ω,ω'-disulfanediyldialkaneamine, N,N'-di-(benzimidazole-2-yl)-ω,ω'-disulfanediyldialkaneamide, bis[ω-(benzimidzole-1-yl)-ω-oxoalkyl]disulfane, bis[ω-(2,3-diphenylguanidino)alkyl]disulfane in which $R_D$ is an alkyl group, an acyl group, an alkylamino group or an alkylamide group each having a linear or branched alkyl chain part having 2 to 8 carbon atoms which is connected to a benzimidazole group or a guanidine group substituted with a linear, branched or alicyclic alkyl group having 1 to 8 carbon atoms, and an aryl group. Hydrogens on a carbon atom and a nitrogen atom of the benzimidazoles in the compounds described above may be substituted with any of a linear or branched alkyl group having 1 to 4 carbon atoms, a halogen atom, an amino group, a hydroxyl group and a mercapto group.

The carboxylic hydrazide compound (E) which can be used in the present invention is represented by the following Formula (V):

(V)

(wherein $R_E$ represents any of an alkyl group, an acyl group, an alkylamino group and an alkylamide group each having a linear or branched alkyl chain having 2 to 8 carbon atoms which is connected to a benzimidazole group or a guanidine group; hydrogens on a carbon atom and a nitrogen atom of the benzimidazole skeleton may be substituted with any of a linear or branched alkyl group having 1 to 4 carbon atoms, a halogen atom, an amino group, a hydroxyl group and a mercapto group; and the guanidine group may be substituted with any of a linear, branched or alicyclic alkyl group having 1 to 8 carbon atoms, and an aryl group).

The carboxylic hydrazide (E) represented by Formula (V) is distinguished from the alkylidene hydrazide (C) described above and have no C=N double bond. It is derived from carboxylic acid having a linear alkyl chain part having 2 to 8 carbon atoms, and the compound is carboxylic amide in which an acyl group is connected to a nitrogen atom at one side of hydrazine. In particular, used in the present invention is the compound having a benzimidazole group connected to the alkyl chain part directly or via a nitrogen atom at carbon or nitrogen of a five-membered ring part, or a guanidine group. Also, hydrogens on a carbon atom and a nitrogen atom of the benzimidazole group may be substituted with any of a linear or branched alkyl group having 1 to 4 carbon atoms, a halogen atom, an amino group, a hydroxyl group and a mercapto group. The specific compound includes such as 2-[(1H-benzimidazole-2-yl)amino]acetohydrazide, and 2-(2-amino-benzimidazole-1-yl) acetohydrazide.

A total blend amount of at least one carbon black coupling agent selected from the bismaleimide compound (B), the alkylidene hydrazide compound (C), the disulfane compound (D) and the carboxylic hydrazide compound (E) is 0.05 to 20 parts by weight based on 100 parts by weight of the rubber component. If the total blend amount is less than 0.05 part by weight, the effects cannot be expected, and if the amount exceeds 20 parts by weight, the heat generation is significantly deteriorated. If the total blend amount is 2 to 20 parts by weight, the heat generation tends to be reduced in improvement, but the crack resistance is improved, so that the carbon black coupling agent is allowed to be used in an amount of 20 parts by weight or less from the viewpoint of a balance between both effects. The carbon black coupling agent is used preferably in an amount of 0.05 to 2 parts by weight. At least one carbon black coupling agent selected from the above compounds (B) to (E) is blended preferably together with the carbon black (A) satisfying the conditions of $\Delta D_{10}$ and $\Delta D_{80}$ in particle size distribution when the carbon black (A) is blended and kneaded with the rubber composition. In the above case, the carbon black coupling agent is added preferably after a blend timing and one lump or divided blending of the carbon black coupling agent are suitably selected so that they meet the method for blending the carbon black (A) with the rubber composition.

Natural rubber (NR) alone or synthetic rubber selected from such as isoprene rubber (IR), butadiene rubber (BR), chloroprene rubber (CR), butyl rubber (TIR), styrene-butadiene rubber (SBR), acrylonitrile-butadiene rubber (NBR), and ethylene-propylene-diene rubber (EPDM) can suitably be blended so that 100 parts by weight of rubber composed of 50 to 100 parts by weight of the natural rubber and/or 0 to 50 parts by weight of the synthetic rubber is obtained, and the rubber can be used for the rubber composition of the present invention. The natural rubber accounts preferably for 80 to 100 parts by weight.

The rubber composition of the present invention can contain various components usually used in the rubber industry in addition to the rubber component described above and the carbon black satisfying the conditions of $\Delta D_{10}$ and $\Delta D_{80}$ in particle size distribution. Capable of being listed as various components are, for example, additives such as fillers (for example, reinforcing fillers such as silica, and inorganic fillers such as calcium carbonate); vulcanization accelerators; anti-aging agent; zinc oxide; stearic acid; softening agents; and antiozonats. Capable of being listed as the vulcanization accelerators are thiazole base vulcanization accelerators such as M (2-mercaptobenzothiazole), DM (dibenzothiazolyl disulfide) and CZ (N-cyclohexyl-2-dibenzothiazolylsulfenamide); thiuram base vulcanization accelerators such as TT (tetramethylthiuram sulfide); and guanidine base vulcanization accelerators such as DPG (diphenylguanidine).

Further, sulfur can be added in a range of 1 to 10 parts by weight based on 100 parts by weight of the rubber component, and it can be added in a range of preferably 1 to 7 parts by weight, more preferably 2 to 4 parts by weight.

The rubber composition obtained by using the carbon black according to the present invention can be produced by kneading the components by means of, for example, a Bunbary mixer, a kneader and the like, and it exerts a low heat generation and a high durability as compared with conventional rubber compositions, so that the rubber composition can suitably be used for soft stiffener parts of large-sized tires for such as buses, trucks, and heavy equipments.

Figure 2:
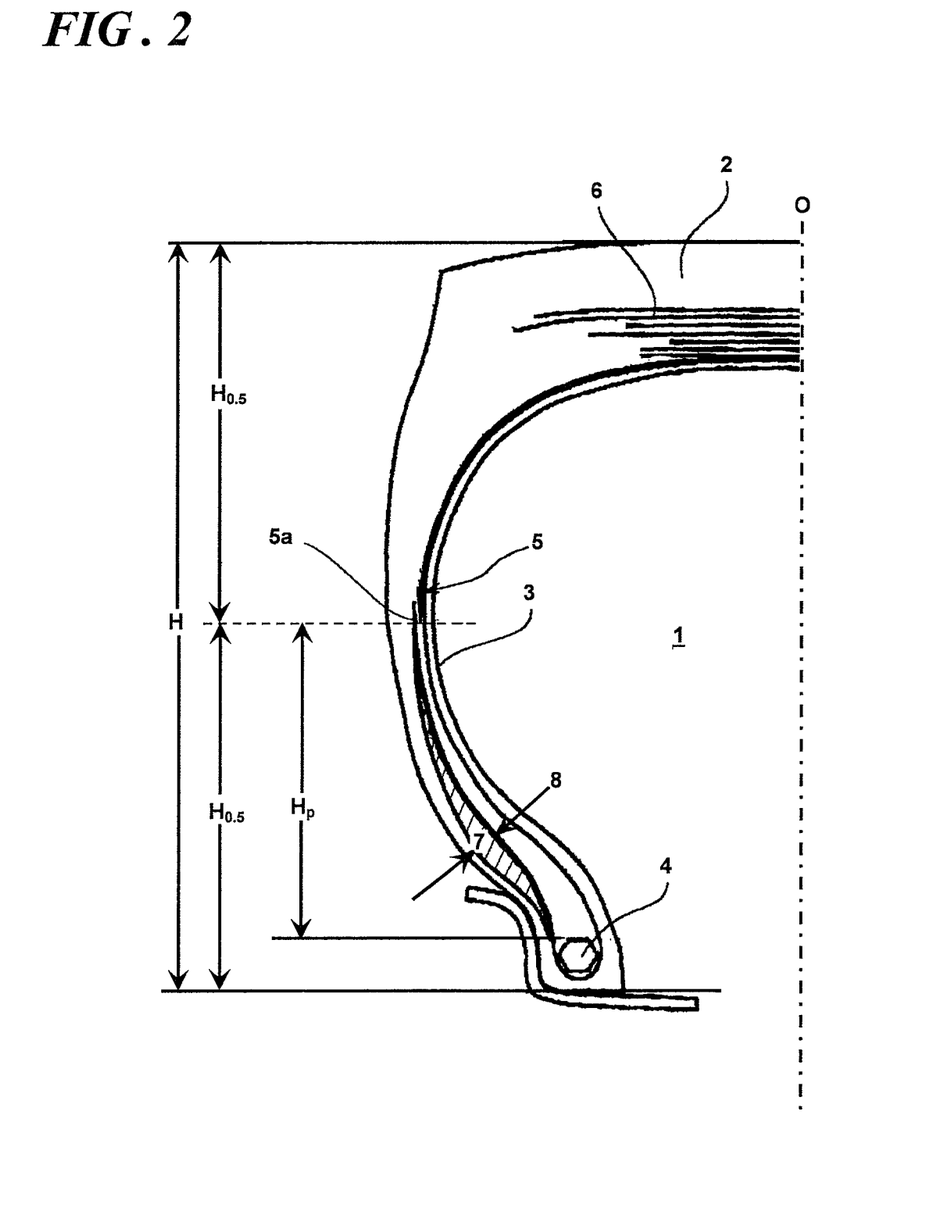
FIG. 2 is a half part cross-sectional schematic drawing of a conventional tire for large size vehicles.

FIG. 2 is a half part cross-sectional drawing showing a tire for large size vehicles. In the tire 1 of the present embodiment shown in FIG. 2, a soft stiffener rubber composition provided on a part or a whole of a region 7 which is adjacent to an outside of a fold ply cord 5a folded at a bead 4 and which is as high as a half or less of a tire height H and is present more upward than the above bead 4 is prepared by blending, as described above, the rubber component composed of 50 parts by weight of the natural rubber based 100 parts by weight of the rubber component with 20 to 110 parts by weight of the carbon black satisfying the conditions of $\Delta D_{10}$ and $\Delta D_{80}$ and 0.05 to 20 parts by weight of at least one carbon black coupling agent selected from the compounds (B) to (E).

That is, the tire 1 of the present embodiment comprises, as is the case with tires for usual large-sized vehicles, a tread part 2, a pair of side walls 3 arranged at both sides thereof, and a pair of beads 4. The above respective parts are provided with a carcass 5 mounted between the bead part 4 buried and another bead part 4 which is not illustrated, and a belt layer 6 comprising plural steel cords for reinforcing the tread part 2 at an outside of the carcass 5. The carcass and the belt comprise a carcass ply layer and a belt ply layer which are prepared by coating a metal reinforcing member such as steel cords with coating rubber. Also, the coating rubber is used in such a manner as coating directly on the surface of the metal reinforcing member such as steel cords, or coating the periphery of a matter woven from metal cords and the like.

Herein, the rubber composition of the present invention is applied to large-sized heavy-duty tires having a tire rim diameter of preferably 25 inch or more, further preferably 40 inch or more. In the above case, the rubber composition is applied more suitably to tires in which a maximum part (length of 8 in FIG. 2) of a thickness of the fold ply cord 5a up to the surface of the tire, that is, a maximum gauge is 30 mm or more, particularly 40 mm or more.

A soft stiffener rubber 7 comprising the rubber composition described above accounts for preferably at least 50% by volume, particularly preferably 60% by volume.

In the tire constituted by providing the soft stiffener rubber described above, the soft stiffener rubber is improved in a heat generation and a crack resistance. For example, the rubber is not distorted after running under a heavy load, and the tire is enhanced in a crack resistance and improved in a running durability and a safety. Accordingly, the soft stiffener rubber is suited to tires for large-sized vehicles and a heavy load. The tire of the present invention can be charged in an inside with not only air but also inert gas such as nitrogen.

EXAMPLES

Next, the present invention shall be explained in further details with reference to examples and comparative examples, but the present invention shall not be restricted to examples and comparative examples.

Rubber compositions for soft stiffener rubbers were prepared by blending 100 parts by weight of a polymer comprising natural rubber and/or synthetic rubber with components including the carbon blacks satisfying the various conditions of $\Delta D_{10}$ and $\Delta D_{80}$ shown in Table 1, and the rubber compositions were vulcanized on the conditions of 145° C. and 60 minutes to produce tires having a tire size of 4000R57. The respective trial tires thus obtained were used to evaluate a heat generation and durability of a soft stiffener rubber part 7 by the following evaluation methods.

Evaluation of Heat Generation:

Rubbers at an outside far by 1 mm from a fold ply in a soft stiffener rubber part at an outside of the fold ply in a second rim line part of the product tires were sampled to measure viscoelasticities by means of a spectrometer and compare viscoelasticities at 5% tan δ. The values in Examples 1 to 17 and Comparative Examples 1 to 6 were shown by indices, wherein the value in Comparative Example 1 was set to 100, and the values in Examples 18 to 30 and Comparative Examples 7 to 9 were shown by indices, wherein the value in Comparative Example 7 was set to 100. The larger the value is, the better the heat generation is.

Evaluation of Durability:

Soft stiffener rubbers of the product tires were sampled in the same manner as described above, and the rubber samples thus obtained were used to measure durabilities by means of a cyclic fatigue tester and compare them according to a breaking frequency causing breakage. The values in Examples 1 to 17 and Comparative Examples 1 to 6 were shown by indices, wherein the value in Comparative Example 1 was set to 100, and the values in Examples 18 to 30 and Comparative Examples 7 to 9 were shown by indices, wherein the value in Comparative Example 7 was set to 100. The larger the value is, the better the durability is.

TABLE 1

(blend part: based on 100 parts by weight of rubber component)

| | Comparative Example | | | Example | | | | | | | | |
|---|---|---|---|---|---|---|---|---|---|---|---|---|
| | 1 | 2 | 3 | 1 | 2 | 3 | 4 | 5 | 6 | 7 | 8 | 9 |
| Natural rubber | 100 | 100 | 100 | 100 | 100 | 100 | 100 | 100 | 100 | 100 | 100 | 100 |
| SBR | | | | | | | | | | | | |
| BR | | | | | | | | | | | | |
| Coupling agent code | | | | a | a | a | a | a | a | a | a | b |
| Blend parts | | | | 1 | 1 | 0.01 | 0.06 | 1 | 2 | 20 | 21 | 1 |

TABLE 1-continued (blend part: based on 100 parts by weight of rubber component)

|  | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|
| Common components Carbon black | 9.05 | 9.05 | 9.05 | 9.05 | 9.05 | 9.05 | 9.05 | 9.05 | 9.05 | 9.05 | 9.05 | 9.05 |
| Particle size distribution |  |  |  |  |  |  |  |  |  |  |  |  |
| $\Delta D_{80}$ | 0.038 | 0.113 | 0.054 | 0.057 | 0.060 | 0.042 | 0.043 | 0.045 | 0.048 | 0.031 | 0.041 | 0.011 |
| $\Delta D_{10}$ | 0.126 | 0.409 | 0.291 | 0.207 | 0.380 | 0.322 | 0.333 | 0.325 | 0.326 | 0.401 | 0.352 | 0.387 |
| $\Delta D_{10}$ central value | 0.063 | 0.205 | 0.141 | 0.092 | 0.210 | 0.162 | 0.157 | 0.165 | 0.172 | 0.182 | 0.174 | 0.145 |
| Heat generation (index) *1 | 100 | 137 | 118 | 102 | 117 | 121 | 123 | 118 | 121 | 109 | 92 | 130 |
| Crack resistance (index) *2 | 100 | 64 | 86 | 120 | 106 | 87 | 112 | 131 | 135 | 137 | 139 | 105 |

|  | Example 10 | Example 11 | Example 12 | Example 13 | Example 14 | Example 15 | Comparative Example 4 | Comparative Example 5 | Example 16 | Comparative Example 6 | Example 17 |
|---|---|---|---|---|---|---|---|---|---|---|---|
| Natural rubber | 100 | 100 | 100 | 100 | 100 | 100 | 80 | 80 | 80 | 80 | 80 |
| SBR |  |  |  |  |  |  | 20 | 20 | 20 |  |  |
| BR |  |  |  |  |  |  |  |  |  | 20 | 20 |
| Coupling agent code | b | b | b | c | d | e |  | a | a |  | b |
| Blend parts | 1 | 1 | 1 | 1 | 1 | 1 |  | 1 | 1 |  | 1 |
| Common component Carbon black | 9.05 | 9.05 | 9.05 | 9.05 | 9.05 | 9.05 | 9.05 | 9.05 | 9.05 | 9.05 | 9.05 |
| Particle size distribution |  |  |  |  |  |  |  |  |  |  |  |
| $\Delta D_{80}$ | 0.037 | 0.047 | 0.057 | 0.032 | 0.041 | 0.039 | 0.084 | 0.087 | 0.051 | 0.091 | 0.058 |
| $\Delta D_{10}$ | 0.507 | 0.335 | 0.409 | 0.272 | 0.401 | 0.261 | 0.310 | 0.302 | 0.299 | 0.332 | 0.443 |
| $\Delta D_{10}$ central value | 0.192 | 0.177 | 0.190 | 0.133 | 0.157 | 0.131 | 0.150 | 0.152 | 0.142 | 0.161 | 0.190 |
| Heat generation (index) *1 | 129 | 135 | 139 | 121 | 127 | 120 | 116 | 121 | 123 | 118 | 121 |
| Crack resistance (index) *2 | 102 | 112 | 103 | 103 | 109 | 104 | 91 | 89 | 102 | 92 | 108 |

*1 the larger the value is, the more excellent the heat generation is
*2 the larger the value is, the more excellent the crack resistance is

TABLE 2

| | Comparative Example | | | Example | | | | |
|---|---|---|---|---|---|---|---|---|
| | 7 | 8 | 9 | 18 | 19 | 20 | 21 | 22 |
| Natural rubber | 100 | 100 | 100 | 100 | 100 | 100 | 100 | 100 |
| SBR | | | | | | | | |
| BR | | | | | | | | |
| Coupling agent code | | | c | c | d | e | f | g |
| Blend parts | | | 1 | 1 | 0.5 | 0.5 | 2 | 1 |
| Common component | 9.05 | 9.05 | 9.05 | 9.05 | 9.05 | 9.05 | 9.05 | 9.05 |
| Carbon black | | | | | | | | |
| Particle size distribution | | | | | | | | |
| $\Delta D_{80}$ | 0.020 | 0.110 | 0.081 | 0.050 | 0.050 | 0.050 | 0.050 | 0.050 |
| $\Delta D_{10}$ | 0.120 | 0.400 | 0.067 | 0.420 | 0.420 | 0.420 | 0.420 | 0.420 |
| $\Delta D_{80}$ central value | 0.110 | 0.200 | 0.063 | 0.158 | 0.158 | 0.158 | 0.158 | 0.158 |
| Heat generation (index) *1 | 100 | 128 | 90 | 116 | 119 | 116 | 105 | 115 |
| Crack resistance (index) *2 | 100 | 52 | 138 | 102 | 105 | 106 | 105 | 105 |

| | Example | | | | | | | |
|---|---|---|---|---|---|---|---|---|
| | 23 | 24 | 25 | 26 | 27 | 28 | 29 | 30 |
| Natural rubber | 100 | 100 | 100 | 100 | 100 | 100 | 100 | 100 |
| SBR | | | | | | | | |
| BR | | | | | | | | |
| Coupling agent code | h | i | j | k | m | n | c | c |
| Blend parts | 1 | 1 | 1 | 1 | 1 | 1 | 1 | 2 |
| Common component | 9.05 | 9.05 | 9.05 | 9.05 | 9.05 | 9.05 | 9.05 | 9.05 |
| Carbon black | | | | | | | | |
| Particle size distribution | | | | | | | | |
| $\Delta D_{80}$ | 0.050 | 0.050 | 0.050 | 0.050 | 0.050 | 0.050 | 0.040 | 0.020 |
| $\Delta D_{10}$ | 0.420 | 0.420 | 0.420 | 0.420 | 0.420 | 0.420 | 0.350 | 0.390 |
| $\Delta D_{80}$ central value | 0.158 | 0.158 | 0.158 | 0.158 | 0.158 | 0.158 | 0.110 | 0.028 |
| Heat generation (index) *1 | 116 | 114 | 119 | 115 | 108 | 115 | 138 | 100 |
| Crack resistance (index) *2 | 106 | 108 | 104 | 108 | 111 | 102 | 106 | 142 |

*1 the larger the value is, the more excellent the heat generation is
*2 the larger the value is, the more excellent the crack resistance is Synthetic Rubbers:
  SBR: styrene-butadiene rubber
  BR: butadiene rubber
Carbon Black Coupling Agents:
  Compound a: N,N'-diphenylmethanebismaleimide, manufacture by Mitsui Chemicals, Inc.
  Compound b: 3-hydroxy-N-(1,3-dimethylbutylidene)-2-naphthoic hydrazide
  Compound c: 3-hydroxy-N-(1-methylethylidene)-2-naphthoic hydrazide
  Compound d: N,N'-di(1-methylethylidene)-isophthalic dihydrazide
  Compound e: N-(1-methylethylidene)-isonicotinhydrazide
  Compound f: tetrakis(2-ethylhexyl)thiuram disulfide
  Compound g: N,N'-di-(1H-benzimidzole-2-yl)-2,2'-disulfanediylethaneamine
  Compound h: N,N'-di-(1H-benzimidzole-2-yl)-3,3'-disulfanediyldipropaneamide
  Compound i: bis[3-(2-aminobenzimidazole-1-yl)-3-oxopropyl]disulfane
  Compound j: bis[6-(2-amino-benzimidazole-1-yl)-6-oxohexyl]disulfane
  Compound k: bis[2-(2,3-diphenylguanidino)ethyl]disulfane
  Compound m: 2-[(1H-benzimidazole-2-yl)amino]acetohydrazide
  Compound n: 2-(2-amino-benzimidazole-1-yl)acetohydrazide
Contents of Common Components and Blend Parts Thereof (9.05 Parts by Mass in Total):
  Stearic acid: 2 parts by mass
  Zinc oxide: 3 parts by mass
Anti-aging agent: Nocrac 6C, 0.95 part by mass, manufactured by Ouchi Shinko Chemical Industrial Co., Ltd.
  Vulcanization accelerating agent: Nocceler CZ (N-cyclohexyl-2-benzothiazylsulfeneamide), 0.8 part by mass, manufactured by Ouchi Shinko Chemical Industrial Co., Ltd.
  Sulfur: 2.3 parts by mass
  Carbon black (A): in the examples, produced by blending two kinds of carbon blacks corresponding to N660 and N330 in ASTM standards, manufactured by Asahi Carbon Co., Ltd.

In Table 1, it was difficult to cause the heat generation and the crack resistance to be consistent in Comparative Examples 1 and 2 in which natural rubber was used, in which the carbon black (A) did not satisfy the conditions of $\Delta D_{10}$ and $\Delta D_{80}$ and in which the dispersion improving agent was not used. In Comparative Example 3 in which the carbon black (A) satisfied the conditions and in which the carbon black coupling agent was not used, it was difficult to improve the tire so as to cause the heat generation and the crack resistance to be consistent. In Examples 1 and 2 in which the carbon black satisfied the conditions of the distribution widths of $\Delta D_{10}$ and $\Delta D_{80}$ and in which the maleimide (B) as the carbon black coupling agent was added, the effect of improving the heat generation and the crack resistance was observed. Further, in Example 3 in which the carbon black satisfied not only the conditions of the distribution widths but also the condition of the $\Delta D_{10}$ central value and in which the maleimide (B) was added though in a small amount, both the heat generation and the crack resistance tended to be improved, and the addition effect thereof was observed. Further, in Examples 4 to 6 in which the maleimides (B) were added in more suitable amounts, both the low heat generation and the crack resistance were excellent. In Example 7 in which the maleimide (B) was added in an optimum amount though a little excessive and Example 8 in which the maleimide (B) was added in an amount exceeding the above amount, the heat generation exceeded the peak but fell in an allowable range, and particularly the crack resistance which was difficult to be improved without using the carbon black coupling agent was observed to be enhanced. Also in Examples 9 to 12 in which the alkylidene hydrazides (C) were used as the carbon black coupling agent in suitable amounts, both the heat generation and the crack resistance were observed to be consistent and improved well. Particularly in Example 9, the carbon black (A) having $\Delta D_{80}$ narrow distribution width was used. In Comparative Examples 4 to 6 in which the synthetic rubbers were added to the rubber component and in which the carbon black did not satisfy the conditions, the crack resistance was hard to be improved regardless of the presence or absence of the carbon black coupling agent. In Examples 16 and 17 in which the carbon black (A) satisfied the conditions and in which the carbon black coupling agent was used in a suitable amount, both the heat generation and the crack resistance were good as well.

Next, in Table 2, the carbon black (A) was investigated with a focus on the effect of the central value of $\Delta D_{10}$ in addition to the effects of the conditions of $\Delta D_{10}$ and $\Delta D_{80}$, and observing based on Comparative Example 7 in which the carbon black coupling agent was not used, particularly in Comparative Examples 8 and 9 in which the carbon black (A) did not satisfy the conditions of both the distribution width and the central value of $\Delta D_{80}$, a good balance between the heat generation and the crack resistance was not observed to be improved even if the carbon black coupling agent was used in Comparative Example 9. In all of Examples 18 to 28 in which the carbon black (A) satisfied not only the conditions of $\Delta D_{10}$ and $\Delta D_{80}$ but also the condition of the central value of $\Delta D_{80}$ and in which the carbon black coupling agent was changed to the alkylidene hydrazide (C), the disulfane (D) and carboxylic hydrazide while suitably adjusting the blend amounts thereof, it was shown that a balance between the heat generation and the crack resistance was good. Also in Example 29 in which $\Delta D_{80}$ had a small distribution width, particularly the heat generation was observed to be improved. On the other hand, in Example 30 in which a distribution width of $\Delta D_{80}$ was further reduced and in which a central value of $\Delta D_{80}$ deviated from the suitable range, the crack resistance was enhanced by increasing an amount of the carbon black coupling agent.

INDUSTRIAL APPLICABILITY

Carbon black which comprises components having different particle sizes and which is excellent in an effect of improving the low generation and the crack resistance is obtained by making use of the present invention. Further, a rubber composition having an ultralow heat generation while maintaining a balance thereof with a crack resistance, and a heavy-duty tire produced by using the above rubber composition for a soft stiffener part are obtained by using the above carbon black in combination with at least one carbon black coupling agent selected from the compounds (B) to (E).

LETTERS and NUMERALS

1 Tire
2 Tread
3 Side wall
4 Bead
5 Carcass (ply cord)
5a Fold ply cord
6 Belt
7 Soft stiffener setting region
8 Maximum gauge

The invention claimed is:

1. A rubber composition comprising a natural rubber and/or a synthetic rubber, wherein carbon black (A) contained in the rubber has $\Delta D_{80}$ and $\Delta D_{10}$ satisfying 0.01 μm≤particle size distribution $\Delta D_{80}$≤0.06 μm and 0.2 μm≤particle size distribution $\Delta D_{10}$≤0.6 μm, and the composition contains at least one compound selected from carbon black coupling agents consisting of bismaleimide (B), alkylidene hydrazide (C), disulfane (D) and carboxylic hydrazide (E);
wherein $\Delta D_{80}$ and $\Delta D_{10}$ each represent widths of distribution at 80% and 10% of a maximum point in terms of a height of a frequency in an aggregate mass distribution curve obtained by centrifugal settling particle size distribution measurement according to JIS K6217-6.

2. The rubber composition as described in claim 1, wherein a $\Delta D_{10}$ central value of the carbon black (A) contained in the rubber is 0.1 μm or more and 0.2 μm or less;
wherein the $\Delta D_{10}$ central value is a central value of distribution at 10% of a maximum point in terms of a height of a frequency in an aggregate mass distribution curve obtained by centrifugal settling particle size distribution measurement according to JIS K6217-6.

3. The rubber composition as described in claim 1, wherein a $\Delta D_{80}$ central value of the carbon black (A) contained in the rubber is 0.03 μm or more and 0.15 μm or less;
wherein the $\Delta D_{80}$ central value is a central value of distribution at 80% of a maximum point in terms of a height of a frequency in an aggregate mass distribution curve obtained by disc centrifugal settling type particle size distribution measurement according to JIS K6217-6.

4. The rubber composition as described in claim 1, wherein the carbon black (A) is obtained at a single step by burning in a production furnace, or obtained by mixing two or more components of carbon blacks or removing partially carbon blacks having some particle size region from carbon blacks having a broad particle size distribution.

5. The rubber composition as described in claim 1, wherein the carbon black (A) is obtained by mixing two or more components of carbon blacks.

6. The rubber composition as described in claim 1, wherein the carbon black (A) satisfies 0.25 μm≤particle size distribution $\Delta D_{10}$≤0.45 μm and 0.03 μm≤particle size distribution $\Delta D_{80}$≤0.05 μm.

7. The rubber composition as described in claim 1, wherein the bismaleimide (B) contains at least one selected from the group consisting of compounds represented by the following Formula (I):

(I)

wherein R represents a divalent aromatic hydrocarbon group having 6 to 30 carbon atoms, or a divalent alkyl aromatic hydrocarbon group having 7 to 24 carbon atoms, and x and y each represent independently an integer of 0 to 3.

8. The rubber composition as described in claim 1, wherein the alkylidene hydrazide (C) contains at least one selected from the group consisting of compounds represented by the following Formula (II) or (III):

wherein $R_A$ represents one selected from a divalent aromatic hydrocarbon group having 6 to 30 carbon atoms, a divalent hydrocarbon group obtained by removing two hydrogen atoms in any positions from a saturated or unsaturated aliphatic hydrocarbon having 0 to 18 carbon atoms, and a carbonyl group; $R_B$ represents a divalent aromatic group having 6 to 30 carbon atoms; a substituent X of $R_B$ is at least one selected from a hydroxyl group and an amino group, or $R_B$ is a pyridinediyl group, and X is a hydrogen atom to cause $R_B$—X to form a pyridyl group; $R_1$ to $R_4$ represent hydrogen and a linear, branched or cyclic alkyl group having 1 to 18 carbon atoms, or an aromatic group, and $R_1$ to $R_4$ may be the same as or different from each other.

9. The rubber composition as described in claim 1, wherein the disulfane (D) contains at least one selected from the group consisting of compounds represented by the following Formula (IV):

(IV)

wherein $R_D$ represents a thiocarbamoyl group, or any of an alkyl group, an acyl group, an alkylamino group and an alkylamide group each having a linear or branched alkyl chain having 2 to 8 carbon atoms which is connected to a benzimidazole group or a guanidine group; the thiocarbamoyl group has any of a linear, branched or alicyclic alkyl group having 6 to 10 carbon atoms, and an arylalkyl group substituted with an aromatic group; hydrogens on a carbon atom and a nitrogen atom of the benzimidazole skeleton may be substituted with any of a linear or branched alkyl group having 1 to 4 carbon atoms, a halogen atom, an amino group, a hydroxyl group and a mercapto group; and the guanidine group may be substituted with any of a linear, branched or alicyclic alkyl group having 1 to 8 carbon atoms, and an aryl group.

10. The rubber composition as described in claim 1, wherein the carboxylic hydrazide (E) contains at least one selected from the group consisting of compounds represented by the following Formula (V):

(V)

wherein $R_E$ represents any of an alkyl group, an acyl group, an alkylamino group and an alkylamide group each having a linear or branched alkyl chain having 2 to 8 carbon atoms which is connected to a benzimidazole group or a guanidine group; hydrogens on a carbon atom and a nitrogen atom of the benzimidazole skeleton may be substituted with any of a linear or branched alkyl group having 1 to 4 carbon atoms, a halogen atom, an amino group, a hydroxyl group and a mercapto group; and the guanidine group may be substituted with any of a linear, branched or alicyclic alkyl group having 1 to 8 carbon atoms, and an aryl group.

11. The rubber composition as described in claim 1, wherein a total blend amount of at least one carbon black coupling agent selected from the compounds (B) to (E) is 0.05 to 20 parts by weight based on 100 parts by weight of the rubber component.

12. A heavy-duty tire in which the rubber composition as described in claim 1 is provided in a soft stiffener part.

* * * * *